(12) United States Patent　　(10) Patent No.: US 12,118,703 B2
Harmen et al.　　(45) Date of Patent: Oct. 15, 2024

(54) PHOTO-REALISTIC INFRASTRUCTURE INSPECTION

(71) Applicant: RedZone Robotics, Inc., Warrendale, PA (US)

(72) Inventors: Andrew Harmen, Doylestown, PA (US); Gabe Detter, Landisville, PA (US); Mohamed Morsy, Bridgeville, PA (US); Andrew Lawniczak, South Park Township, PA (US); Galin Konalchiev, Pittsburgh, PA (US); Matthew Crowell, Murrysville, PA (US); Jack Buffington, Pittsburgh, PA (US); Mohsen Pashna, Chatswood (NZ); Richard Rigby, Stillwater (NZ); Jason Mizgorski, Gibsonia, PA (US); Foster J Salotti, Warrendale, PA (US); Jjianan Lin, Auckland (NZ); Valerie Walch, Warrendale, PA (US)

(73) Assignee: RedZone Robotics, Inc., Warrendale, PA (US)

( * ) Notice: Subject to any disclaimer, the term of this patent is extended or adjusted under 35 U.S.C. 154(b) by 10 days.

(21) Appl. No.: 17/365,773

(22) Filed: Jul. 1, 2021

(65) Prior Publication Data

US 2022/0028054 A1　　Jan. 27, 2022

Related U.S. Application Data

(60) Provisional application No. 63/047,393, filed on Jul. 2, 2020.

(51) Int. Cl.
*G06T 7/00*　　(2017.01)
*G06T 7/33*　　(2017.01)
(Continued)

(52) U.S. Cl.
CPC ............ *G06T 7/0004* (2013.01); *G06T 7/344* (2017.01); *G06T 7/55* (2017.01); *G06T 17/20* (2013.01); *G06T 2207/10016* (2013.01)

(58) Field of Classification Search
CPC .... H01L 21/681; G06V 10/507; G06Q 40/02; G06Q 20/042; G06K 9/4642;
(Continued)

(56) References Cited

U.S. PATENT DOCUMENTS 9,852,238 B2　12/2017　Forsyth et al.
10,592,973 B1　3/2020　Eraker
(Continued)

OTHER PUBLICATIONS

Evstigneev, International Search Report and Written Opinion of the International Searching Authority, PCT/US2021/040179, dated Nov. 3, 2021, RU/Federal Institute of Industrial Property, Moscow, Russia, 8 pages.
(Continued)

*Primary Examiner* — Phuoc H Doan
(74) *Attorney, Agent, or Firm* — Gabriel & Co; Andrew M Gabriel

(57) ABSTRACT

One aspect provides a modular inspection robot for inspecting vertical shafts, chambers or tunnels. An embodiment provides related methods and products. One method includes: capturing, using a plurality of video cameras associated with an infrastructure inspection unit, two or more videos of infrastructure; accessing, using one or more processors, image metadata indicating a mesh of connected vertices based on the two or more videos; selecting, using the one or more processors, image data of frames of the two or more videos for inclusion in an output based on the mesh; and outputting, using the one or more processors, a photo-realistic image of the infrastructure comprising the image data selected. Other examples are described and claimed.

18 Claims, 16 Drawing Sheets

(51) Int. Cl.
*G06T 7/55* (2017.01)
*G06T 17/20* (2006.01)

(58) Field of Classification Search
CPC .................. G06T 7/0004; G06T 17/20; G06T 2207/10016; G06T 7/55; G06T 7/344
See application file for complete search history.

(56) References Cited

U.S. PATENT DOCUMENTS

| | | |
|---|---|---|
| 2012/0069172 A1 | 3/2012 | Hudritsch |
| 2013/0155058 A1 | 6/2013 | Golparvar-Fard |
| 2014/0152802 A1 | 6/2014 | Olsson et al. |
| 2019/0104252 A1 | 4/2019 | Starr et al. |
| 2019/0235492 A1 | 8/2019 | Kueny et al. |
| 2019/0242696 A1* | 8/2019 | McAleenan ............ G01S 17/86 |

OTHER PUBLICATIONS

Cooke, E., Extended European Search Report, EP21831652, Jul. 4, 2024, The Hague, 8 pages.

* cited by examiner

PHOTO-REALISTIC INFRASTRUCTURE INSPECTION

CROSS-REFERENCE TO RELATED APPLICATIONS

This application claims priority to U.S. provisional patent application Ser. No. 63/047,393 filed Jul. 2, 2020, and having the title "MULTI-SENSOR VERTICAL INFRASTRUCTURE INSPECTION," the entire contents of which are incorporated by reference herein.

BACKGROUND

Infrastructure such as manholes or other shafts and large chambers need to be inspected and maintained. Visual inspections are often done as a matter of routine upkeep or in response to a noticed issue.

Various systems and methods exist to gather inspection data. For example, inspection data may be obtained by using closed circuit television (CCTV) cameras, sensors that collect visual images, or laser scanning. Such methods include traversing through a conduit such as a manhole or other underground infrastructure asset with an inspection unit and obtaining inspection data regarding the interior, e.g., images and/or other sensor data for visualizing pipe features such as pipe defects, cracks, intrusions, etc. An inspection crew is deployed to a location and individual pipe segments are inspected, often in a serial fashion, in order to collect inspection data and analyze it.

BRIEF SUMMARY

In summary, an embodiment provides a photo-realistic view of infrastructure using a plurality of cameras.

In one example, the plurality of cameras are arranged to capture visual images that have stereo overlap such that distance information may be derived for points within the images.

In one example, a method comprises: capturing, using a plurality of video cameras associated with an infrastructure inspection unit, two or more videos of infrastructure; accessing, using one or more processors, image metadata indicating a mesh of connected vertices based on the two or more videos; selecting, using the one or more processors, image data of frames of the two or more videos for inclusion in an output based on the mesh; and outputting, using the one or more processors, a photo-realistic image of the infrastructure comprising the image data selected.

In one example, the method comprises identifying, using the one or more processors, image data of the frames of the two or more videos of the infrastructure; wherein the selecting comprises selecting first image data of a single frame for inclusion in the photorealistic image.

In one example, the selecting is based on a point of view of a video camera of the plurality of video cameras.

In one example, the photo-realistic image comprises a model.

In one example, the method comprises providing, using the one or more processors, an interface element for culling data from the model.

In one example, the method comprises providing, using the one or more processors, an interface element for indicating a portion of the model.

In one example, the method comprises, responsive to receiving an indication via the interface element, providing quantitative measurement data for a feature of the infrastructure based on the model.

In one example, the method comprises automatically scaling, based on an indicated feature, quantitative measurement data for one or more other features of the infrastructure based on the indication.

In one example, the photo-realistic image is one or more of an image, a frame in a video, a virtual three-dimensional image, and a model comprising pixels of image data of the two or more videos.

In another embodiment, a computer program product comprises: a non-transitory computer readable medium storing computer-executable code comprising: code for accessing two or more videos of infrastructure; code for accessing image metadata indicating a mesh of connected vertices based on the two or more videos; code for selecting image data of frames of the two or more videos for inclusion in an output based on the mesh; and code for outputting a photo-realistic image of the infrastructure comprising the image data selected.

In one example, the computer program product comprises code for identifying image data of the frames of the two or more videos of the infrastructure; wherein the code for selecting comprises code for selecting first image data of a single frame for inclusion in the photorealistic image.

In one example, the code for selecting comprises code for selecting based on a point of view of a video camera of the plurality of video cameras.

In one example, the code for outputting a photo-realistic image comprises code for outputting a model.

In one example, the computer program product comprises code for providing an interface element for culling data from the model.

In one example, the computer program product comprises code for providing an interface element for indicating a portion of the model.

In one example, the computer program product comprises code for, responsive to receiving an indication via the interface element, providing quantitative measurement data for a feature of the infrastructure based on the model.

In one example, the computer program product comprises code for automatically scaling, based on the feature, quantitative measurement data for one or more other features of the infrastructure based on the indication.

In one example, the computer program product provides the photo-realistic image as one or more of an image, a frame in a video, a virtual three-dimensional image, and a model comprising pixels of image data of the two or more videos.

In a further embodiment, a method, comprises: capturing, using a plurality of video cameras associated with an infrastructure inspection unit, two or more videos of infrastructure; accessing, using one or more processors, image metadata indicating overlap between two or more frames of the two or more videos of the infrastructure; selecting, using the one or more processors, image frames for inclusion in an output based on the image metadata; aligning, using the one or more processors, frames of the two or more videos based on the selecting; and outputting, using the one or more processors, a photo-realistic image of the infrastructure comprising the image data selected.

In an example, the photo-realistic image is one or more of an image and a frame in a video comprising the aligned frames.

An embodiment provides a system that includes two, three, four or more high-resolution cameras with stereo overlap. In an embodiment, the system includes integrated photogrammetry capabilities to allow the system to form depth images and utilize ranging via sensed data, e.g., images captured via the cameras.

In an embodiment, the system includes a top unit and a bottom unit in a modular arrangement. In an embodiment, one or more of the top unit and bottom unit may include modular features, e.g., a modular payload, or units of the system may be modular, e.g., a different or additional bottom section may be added.

An embodiment applies fusion of data to generate an output product. In an embodiment, finding depth in images is facilitated by using a photogrammetry approach with stereoscopic cameras. In one example, image or image data includes video or video data, which is recorded via camera (s) and may be transmitted to a remote viewing device in real-time.

In an embodiment, laser sensing integration is provided, e.g., for shaft profiling. In an embodiment, inspection data is incorporated into a scene using modeling, e.g., a three-dimensional (3D) model for reconstruction of a shaft, chamber, tunnel, etc.

An embodiment processes image data for feature detection, recognition and/or tagging via using a defect detection model, such as a defect detection model based on artificial intelligence or a neural network.

An embodiment permits dynamic image capture or processing adjustment to be applied based on environment to ensure clear and proper imagery of the infrastructure asset.

An embodiment provides a modular, man-portable, vertical shaft inspection system or robot. In one embodiment, the system allows a single person the ability to perform a higher number of inspections per day by giving them a lightweight, intelligent and high-resolution system.

An embodiment is lightweight, easy to assemble and disassemble, and easy to carry. In an embodiment, the system is battery operated.

In an embodiment, the inspection system integrates with a cloud or local inspection software ecosystem, e.g., for task assignment and data processing. Real-time feedback or control may be provided to an operator (e.g., field technician) via a mobile application. Real-time feedback to project staff (e.g., in a central office location) is provided via software integration.

The foregoing is a summary and is not intended to be in any way limiting. For a better understanding of the example embodiments, reference can be made to the detailed description and the drawings. The scope of the invention is defined by the claims.

DETAILED DESCRIPTION

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment (s)" (or the like) means that a particular described feature or characteristic is included in that example. The particular feature or characteristic may or may not be claimed. The particular feature may or may not be relevant to other embodiments. For the purpose of this detailed description, each example might be separable from or combined with another example, i.e., one example is not necessarily relevant to other examples.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In other instances, well-known details are not shown or described to avoid obfuscation.

Figure 1:
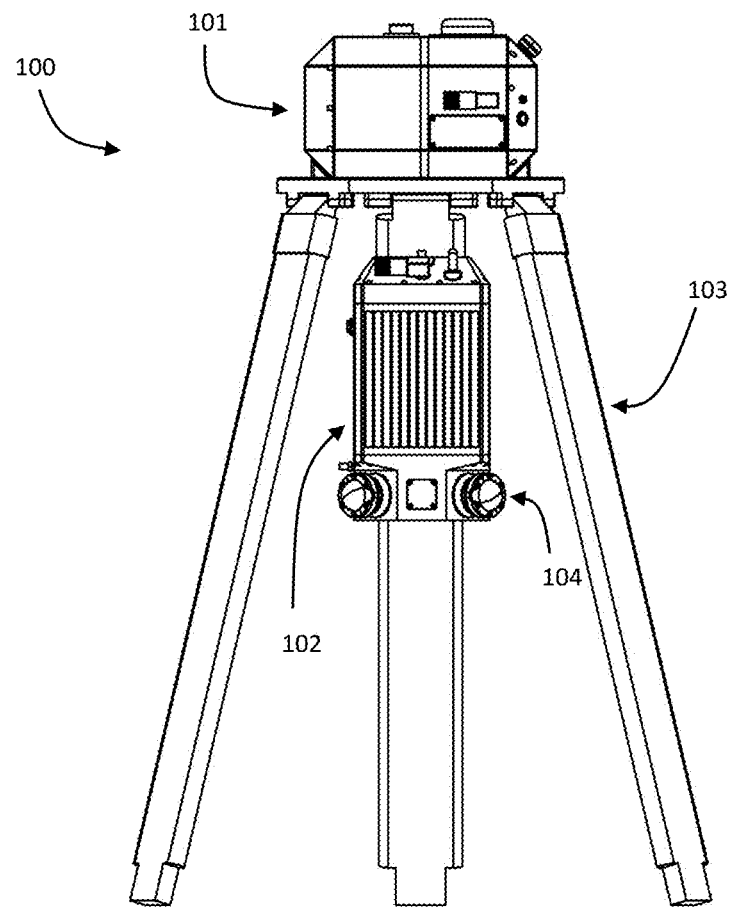
FIG. 1, FIG. 1A, FIG. 1B and FIG. 1C illustrate various views of an example inspection system.
Figure 1A:
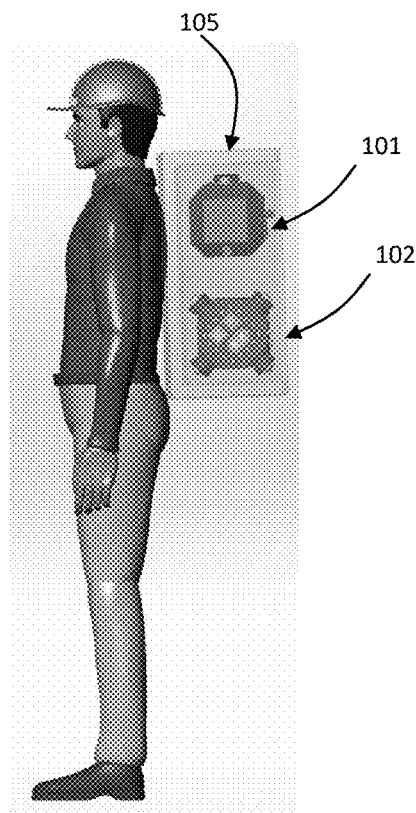

Referring to FIG. 1, an example view is provided in which a manhole inspection system 100 is provided by an embodiment in the form of a tripod 103 that supports an upper 101 and lower unit 102 cooperating to form a manhole inspection system. In an embodiment, by way of example and referring to FIG. 1A, the upper 101 and lower units 102 are sized to fit in a carrying case or backpack 105, which can be taken into the field by a field technician. In one example, the upper and lower units combined weight is about 45 pounds or less, such that the entire system weighs about 45 pounds and can be easily carried. The various views of the system in FIG. 1, including detailed views of the upper 101 and lower units 102, are explained in more detail in FIG. 1B and FIG. 1C.

In the example system 100 of FIG. 1, the tripod-based system 100 is illustrated in which a tripod 103 or another stand supports an upper unit 101 and a lower unit 102. The lower unit 102 is attached by a cable such that it may be lowered from the upper unit 101, e.g., down into a manhole or like infrastructure asset. The upper unit 101 and lower unit 102 may communicate via a suitable mechanism, e.g., wireless communication may be conducted between upper unit 101 and lower unit 102 to communicate control data as well as a sensor data such as image data (which may take the form of video data, HD video data, 4K video data, 8K video data, such as obtained by one or more 13 megapixel cameras, as further described herein) and laser data obtained during an inspection. Alternatively or in addition, the upper unit 101 and lower unit 102 may communicate over a suitable wire, such as USB, HDMI, a combination thereof, or any suitable wireline communication.

Figure 1B:
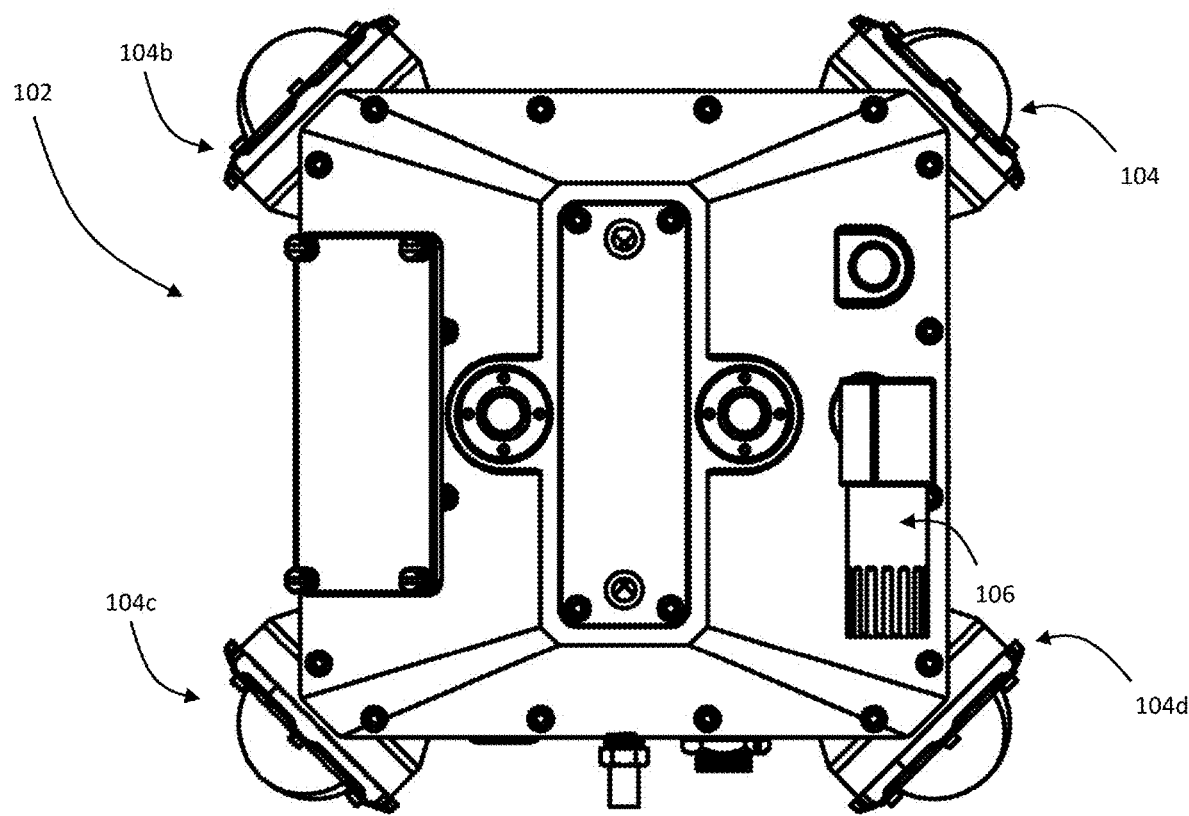
Figure 1C:
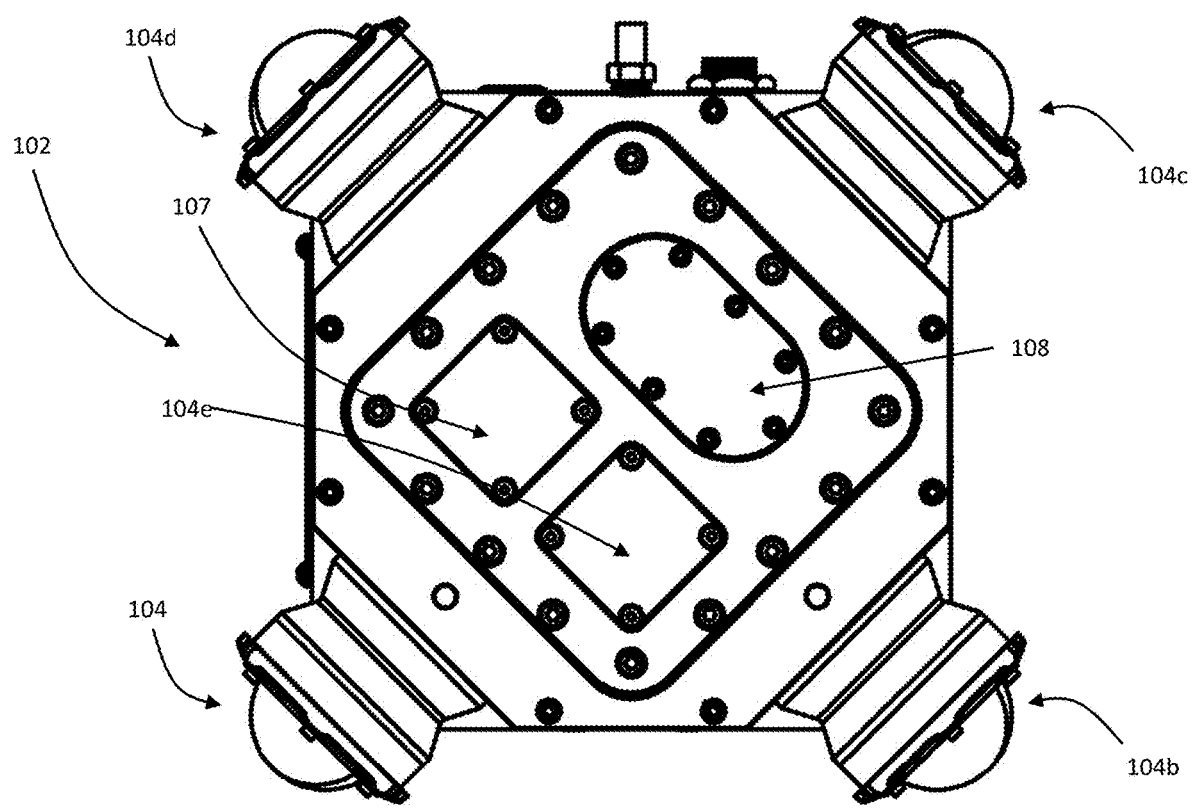

As shown in FIG. 1B and FIG. 1C, the lower unit 102 includes a compliment of sensors, such as four cameras, one of which is indicated at 104, noting that more or fewer cameras may be utilized. The lower unit 102 may also include additional or other sensors, for example a laser range finder, a laser profiler for collecting laser point cloud data, etc. In one example, one or more sensors, such as a sonar unit, may be included in the lower unit 102 to determine the depth of the lower unit 102 or to determine if the lower unit 102 has reached the bottom of a shaft.

In one example the top unit 101 is stacked on top of the tripod or stand 103, with the lower unit 102 beneath. A physical cable may connect the two units 101, 102, and along with an electric motor, lower the lower unit 102 into the manhole. A payout assembly may be included, e.g., in the upper 101 or lower 102 unit, for determining distance. Cameras 104-104*d* of the lower unit 102, one of which is indicated at 104 of FIG. 1, are visible in FIG. 1B and FIG. 1C.

In an example, the top unit 101 includes a power and data connector, which may be waterproof or water resistant, to connect the top unit 101 to a power supply (e.g., for charging an internal battery and/or exchanging data with another system). The top unit 101 also may include a global positioning system (GPS) receiver, which facilitates highly accurate (within about a meter or less) positioning information for the system. The top unit 101 may also or alternatively include other sensor types. For example, the top unit 101 may include sensors such as an inertial measurement unit (IMU), compass, etc., and act to individually or cooperatively provide clock position or orientation information, leveling information (with respect to the ground), etc. The top unit may include an emergency stop (E-Stop) and a leveling bubble. The data collected by the sensor(s) may be fed back to a computer, e.g., a handheld tablet computer operated by a field technician or a remote system operated by a remote technician, such that a technician is aware of the top unit's 101 orientation with respect to a feature of interest, such as the ground (in the case of level) or a landmark, such as a map position marking a suspected location of a manhole or other infrastructure asset.

FIG. 1B and FIG. 1C illustrate example views of a bottom unit 102 of the system 100. As may be appreciated from the description, the bottom unit 102 is a module of the system 100 and may be exchanged with other bottom units, depending on the use context. This may take the form of an entirely different bottom unit as compared to that illustrated in the figures or may take the form of a bottom unit similar to that illustrated in FIG. 1B-C, e.g., a bottom unit 102 with light detecting and ranging (LIDAR) attached to bottom unit 102.

As shown in FIG. 1B (top plan view) and FIG. 1C (bottom plan view), the bottom unit 102 includes a power and data connector, which may be similar to power and data connector for top unit 101. By way of example, power and data connectors may be used to couple top unit 101 and bottom unit 102 to a similar system connection, such as a laptop or other computer. While the top unit 101 and bottom unit 102 communicate data wirelessly between one another, in one example, these units 101, 102 may also be wired to one another to exchange power, data, or a combination thereof.

As with the top unit 101, the bottom unit 102 may be battery powered, with a battery included in a compartment. Further, the bottom unit 102 may include an additional camera 104*e* and LED panel(s) 107 for lighting, as well as a laser range finder 108 for controlling the height of the bottom unit 102.

The bottom unit 102 may include other sensing modules that may be used in combination with visual image data, e.g., captured by cameras 104-104*d*, to provide three-dimensional data for inclusion in depth imagery, virtual reality (VR) or augmented reality (AR) scenes, as described herein. In one example, only visual (e.g., video) image data is used to derive 3D data and depth imagery, e.g., using stereo video analysis. In one example, a visual point cloud is produced solely from stereo video frames.

FIG. 1B illustrates a top plan view of the example bottom unit 102. In this view, an example arrangement of four cameras 104, 104*b*, 104*c*, and 104*d*, which may be configured with wide angle optics such that they each have at least a partially overlapping view of adjacent camera(s). This provides 360 degree viewing coverage, e.g., as the bottom unit 102 is lowered down into a manhole, and facilitates use of stereo imaging techniques for depth imaging.

Referring to FIG. 1C, the bottom of the bottom unit 102 includes one or more LED panels 107, a camera 104*e*, as well as a laser range finder 108. The LED panel(s) 107 (similar LED panels may be included on the side(s) of the top unit 101 or bottom unit 102) permit the bottom unit 102 to illuminate dark interiors such as manholes to provide adequate lighting for visual image capture by the cameras 104, 104*b*, 104*c*, 104*d*, 104*e*. All or some of the LED panels may be automated, e.g., to adjust their brightness or output based on software control, such as using a feedback mechanism based on ambient light, time of day, type of mission, type of infrastructure, etc. Similarly, settings of cameras 104-104*d* may be adjusted, such as automating white balance in response to time, ambient light, infrastructure type, material construction, size or environmental condition, etc. In one example, camera and/or light settings may be automated, e.g., using presets for a mission type that are thereafter adjusted based on conditions encountered in the field.

The laser range finder 108 allows the bottom unit 102 to automate control of its height (alone or in combination with communication with another unit or system, such as top unit 101). This permits for easy operation of the unit 102 to control its decent at a given rate, stop the unit 102 at a programmed height or distance from the bottom, and ensure that the unit 102 traverses down into the manhole and back up again in a controlled fashion, e.g., to a predetermined height or at a predetermined rate.

In one embodiment, the system 100 cooperates to assist locating an infrastructure asset of interest. For example, a technician may initially locate an asset's general location using map data and GPS of a mobile device, such as a smart phone. However, such GPS readings are sometimes inaccurate. Therefore, a highly accurate GPS unit 106 is included in the system 100, such as in top unit 101. The GPS unit 106 may be used to collect accurate GPS data for the location of an infrastructure asset, such as a manhole. This GPS or location data may be transmitted back to a system, such as a mapping system with a mapping application. With such GPS data, it becomes possible to accurately map the locations of infrastructure landmarks for inclusion in a mapping system, the data of which can be communicated, e.g., to a technician's tablet for more accurate location determinations (in the present or in the future).

As may be appreciated, data collected by the system 100 such as GPS data, pose data, clock position, cardinal coordinate data, orientation data, etc., may likewise be used to facilitate highly accurate determinations related to the infrastructure asset being inspected. This facilitates building accurate maps of the infrastructure, which can be incorporated and used to build virtual models of the infrastructure assets and the network of such assets, e.g., based on image or other data (e.g., LIDAR data, laser profiler data, etc.) collected during inspections.

An embodiment therefore facilitates building of virtual models using data collected via the system 100, which can be incorporated into highly accurate and realistic VR or AR scenes. By way of example, using the location data collected by system 100, a program may take in image or other inspection data (e.g., from camera 104) and relate the image to a precise location within an overall infrastructure asset network. This permits the image (after appropriate processing to format it for a chosen display, e.g., VR or AR display) to be included in a VR or AR scene in a highly accurate way.

In an example embodiment, an inspection may proceed as follows. A central or remote device (e.g., in an office) may communicate an inspection plan to a field technician's device, such as a tablet computing device. The field technician's device may run an application that assists the technician in coarsely finding the location of an infrastructure asset to be inspected, such as a manhole. Thereafter, a technician locates the infrastructure asset, e.g., with the help of the GPS unit 106, and sets up the system 100. Once initialized, which may be as simple as a single button press (e.g., soft button press on the application running on the technician's device, physical button press on top unit 101, or similar single action interface), the system 100 automatically interprets the inspection plan, communicated directly to system or indirectly, e.g., via technician's device, begins the inspection, continues the inspection, and ends the inspection.

During the inspection, thereafter, or a combination of the foregoing, the system 100 communicates inspection data, e.g., to technician's device, a remote system, or a combination thereof. The system 100 or a linked system, such as a remote or cloud computer, may act to mark any potential defects in real-time, after the inspection, or a combination of the foregoing. A user of a remote system, such as a central office location, may view inspection data or system 100 metadata (e.g., coordinates, pose, position, operating state, etc.) in real-time or thereafter and communicate with a field technician. A field technician may likewise communicate with remote users and view remote data.

If defect(s) is/are detected during the inspection, these may be marked. For example, with system 100 capturing images, e.g., via camera 104, a system may mark images or sets of images that are scored by a defect detection model as inclusive of a defect. This marking may be based on object or feature recognition or identification and used to generate and alert or other indication, e.g., position marker or visual indication such as a label in a video stream. The marking may be logical marking, e.g., addition of metadata indicating defect containing image(s), which can be used to automatically edit or point to parts of a video stream or image frame that include(s) the defect containing images. This will facilitate review of small amounts of marked data, rather than potentially large amounts of data (much of which contain no defects or are simply carrying an automatically generated label). Therefore, a reviewing technician can be alerted in real time or watch or jump to parts of the inspection data marked by the system as warranting human review.

As described herein, the accurate sensor data collected by the system can be incorporated into another system, such as a mapping system to mark with high accuracy (survey grade GPS) the locations of assets. The data and other data (e.g., automatically detected defects) may also be used in data presentations, such as AR and VR presentations that feature inspection data along with other data, e.g., map data.

By way of example, the system 100 described herein includes automated processing to identify feature defects. For example, a defect detection model may be included in a unit, e.g., the lower unit 102, or another device, e.g., a remote device, for real-time or post-processing defect detection and related functions, such as marking or alerting. By way of example, a memory included in the lower unit 102 may store a defect detection model, e.g., an artificial intelligence model or neural network trained on similar data, such as visual images of manhole feature defects in the nature of cracks, water intrusions, erosion, sediment deposits, etc. This model may be started to process images captured in real-time (e.g., within a second or two) during an inspection. This may be facilitated by utilization of an on-board GPU. With a real-time detection system, the technician or other users may be alerted to a detected defect during the inspection. This may facilitate review of the image data (e.g., incoming video) and any automated labelling applied to the detected defect(s). Alternatively, the defect detection model may be located elsewhere and run at a different time, e.g., as a post inspection step. As above, automated processing, such as editing an inspection video to reduce its content to that which includes suspected defects, may be applied.

When the unit is being lowered into the manhole or retrieved therefrom, images or other data captured by the lower unit 102 are fed into the defect detection model for analysis and classification, e.g., defect/no defect/defect type. If a defect is detected, it may be appropriately processed, e.g., to label it, mark it or used for video editing or image highlighting or indications.

Figure 2:
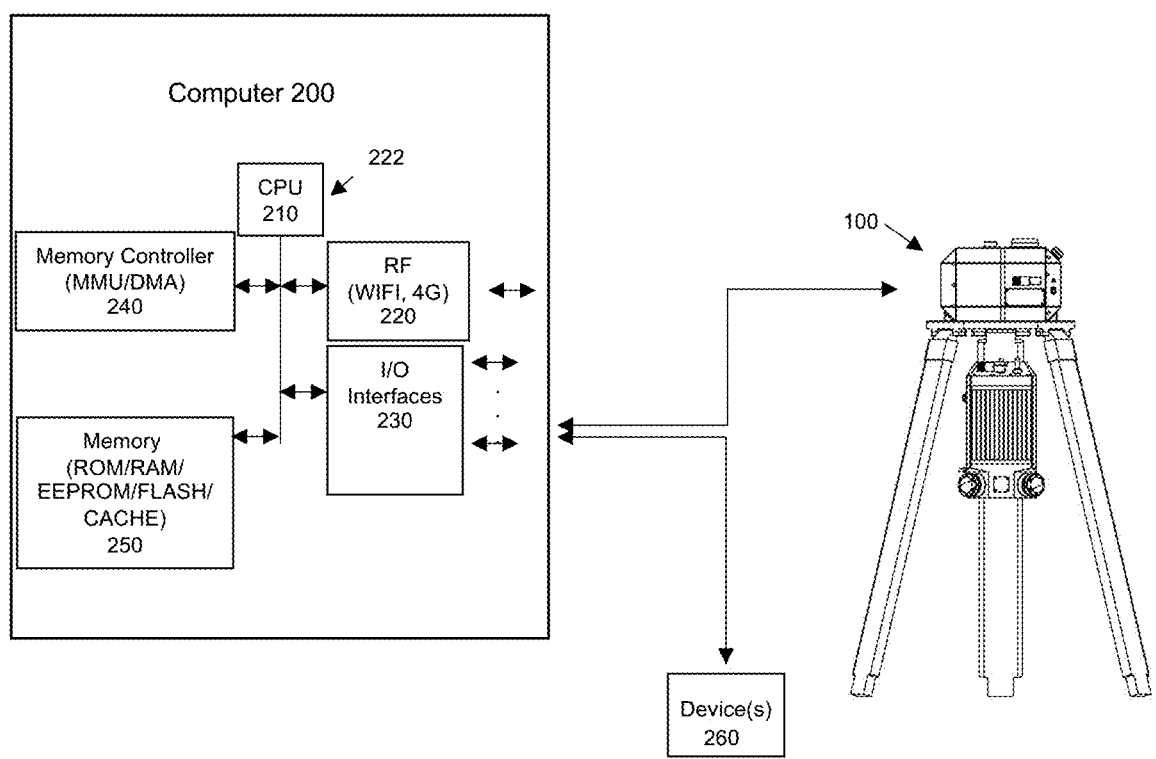
FIG. 2 illustrates an example inspection system.

It will be readily understood that certain embodiments can be implemented using any of a wide variety of devices or combinations of devices. Referring to FIG. 2, an example device that may be used in implementing one or more embodiments includes a computing device (computer) 200, for example included in an inspection system 100, component thereof, e.g., 101, 102, and/or a computer system (e.g., a tablet, laptop or desktop computer).

The computer 200 may execute program instructions or code configured to store and process sensor data (e.g., images from an imaging device as described herein) and perform other functionality of the embodiments. Components of computer 200 may include, but are not limited to, a processing unit 210, which may take a variety of forms such as a central processing unit (CPU), a graphics processing unit (GPU), a combination of the foregoing, etc., a system memory controller 240 and memory 250, and a system bus 222 that couples various system components including the system memory 250 to the processing unit 210. The computer 200 may include or have access to a variety of non-transitory computer readable media. The system memory 250 may include non-transitory computer readable storage media in the form of volatile and/or nonvolatile memory devices such as read only memory (ROM) and/or random-access memory (RAM). By way of example, and not limitation, system memory 250 may also include an operating system, application programs, other program modules, and program data. For example, system memory 250 may include application programs such as image processing software and/or camera operational software. Data may be transmitted by wired or wireless communication, e.g., to or from an inspection robot 100 to another computing device, e.g., a remote device or system 260.

A user can interface with (for example, enter commands and information) the computer 200 through input devices such as a touch screen, keypad, etc. A monitor or other type of display screen or device can also be connected to the system bus 222 via an interface, such as interface 230. The computer 200 may operate in a networked or distributed environment using logical connections to one or more other remote computers or databases. The logical connections may include a network, such local area network (LAN) or a wide area network (WAN) but may also include other networks/buses.

It should be noted that various functions described herein may be implemented using processor executable instructions stored on a non-transitory storage medium or device.

A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), a solid-state drive, or any suitable combination of the foregoing. In the context of this document "non-transitory" media includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN) or the connection may be made through other devices (for example, through the Internet using an Internet Service Provider), through wireless connections, or through a hard wire connection, such as over a USB or another power and data connection.

Figure 3:
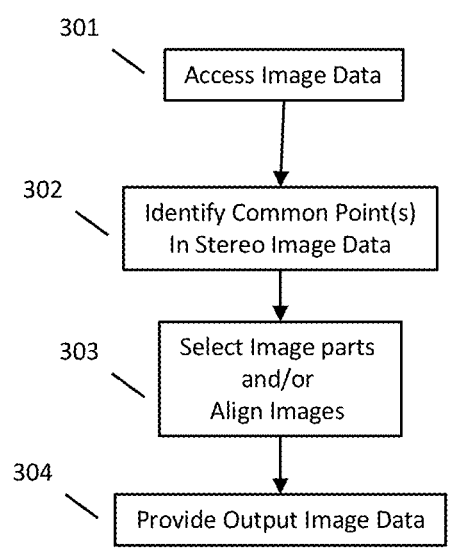
FIG. 3 illustrates an example method.

Referring now to FIG. 3, an embodiment provides a method of providing output image data. In one example, image data is accessed at 301. For example, multiple videos of an infrastructure asset obtained by cameras 104-104d are accessed. The image data may comprise metadata describing the image data, such as time, location, camera, point of view, camera settings, etc.

At 302 common points are identified in stereo image pairs, e.g., frames from one or more of cameras 104-1-4d are used to identify overlapping points in the image data. This may include identifying overlap in images from different cameras, identifying overlap in images from the same camera, e.g., as it changes location or viewpoint, of a combination of the foregoing. This visual point data may be used to create a visual point cloud. As one example, common point(s) in image data, such as frames from two or more videos of an infrastructure asset taken via cameras having different points of view, e.g., spaced 45 or 90 degrees relative to one another, may be obtained as a set of metadata indicating points for a visual 3D model of the infrastructure asset. In one specific, non-limiting example, image processing software may be utilized to process stereo video data and obtain or identify common points at 302, e.g., as vertices for use in a model. In an embodiment additional data is identified, for example vertices or points, and faces drawn to reference an overall physical structure such as a manhole, tunnel or chamber. The locations of the vertices are constructed from the stereo video data content. In an embodiment, each point represents an associated pixel location in 3-D space corresponding to a pixel in an original video frame, which association may be utilized to form an image output, as further described herein.

In another embodiment, the method includes identifying common points in stereo image data at 302 by a straightforward alignment of frames, e.g., from videos from two adjacent cameras. In other words, the identification of common points at 302 may take the form of identifying points in adjacent frames, e.g., via computer vision, feature identification, and/or frame alignment, for aligning and stitching frames from adjacent cameras together.

At 303 images, such as frames from adjacent cameras or image parts, such as pixels from one or more frames of videos from adjacent images, are aligned. In one example, frames are stitched together at the frame level. In an embodiment, individual pixels or pixel groups are aligned with faces and vertices provided by image metadata. In one embodiment, the faces and vertices of provided by the image data provide a model framework or mesh with which to select a best pixel from among competing, available frames of adjacent images. Such pixel selections may be made based on, for example, the point of view for a camera more closely aligning with the view of the point within the model's mesh, the pixel aligning with the face connecting to the point, etc. In other words, the model obtained from the original image data is 3D and therefore includes spatial information with which image frames from the video may be aligned with the model given the point of view of the camera to select the best pixel to place back into an output image, making the output image photo-realistic.

As shown at 304, depending on the technique chosen to align or select image parts, the output image is provided in a photo-realistic representation of the infrastructure asset as a 3D model populated with selected pixels or as a composite video. In other words, an embodiment may output a photo-realistic image comprising image frames that are aligned, allowing an un-warped (or unwrapped) image view of the 360 degree scene, an embodiment may output a photo-realistic image in the form of a model of faces and vertices populated with image pixel data values to provide a photo-realistic image, or a combination of the foregoing may be provided to produce multiple image outputs.

Figure 4:
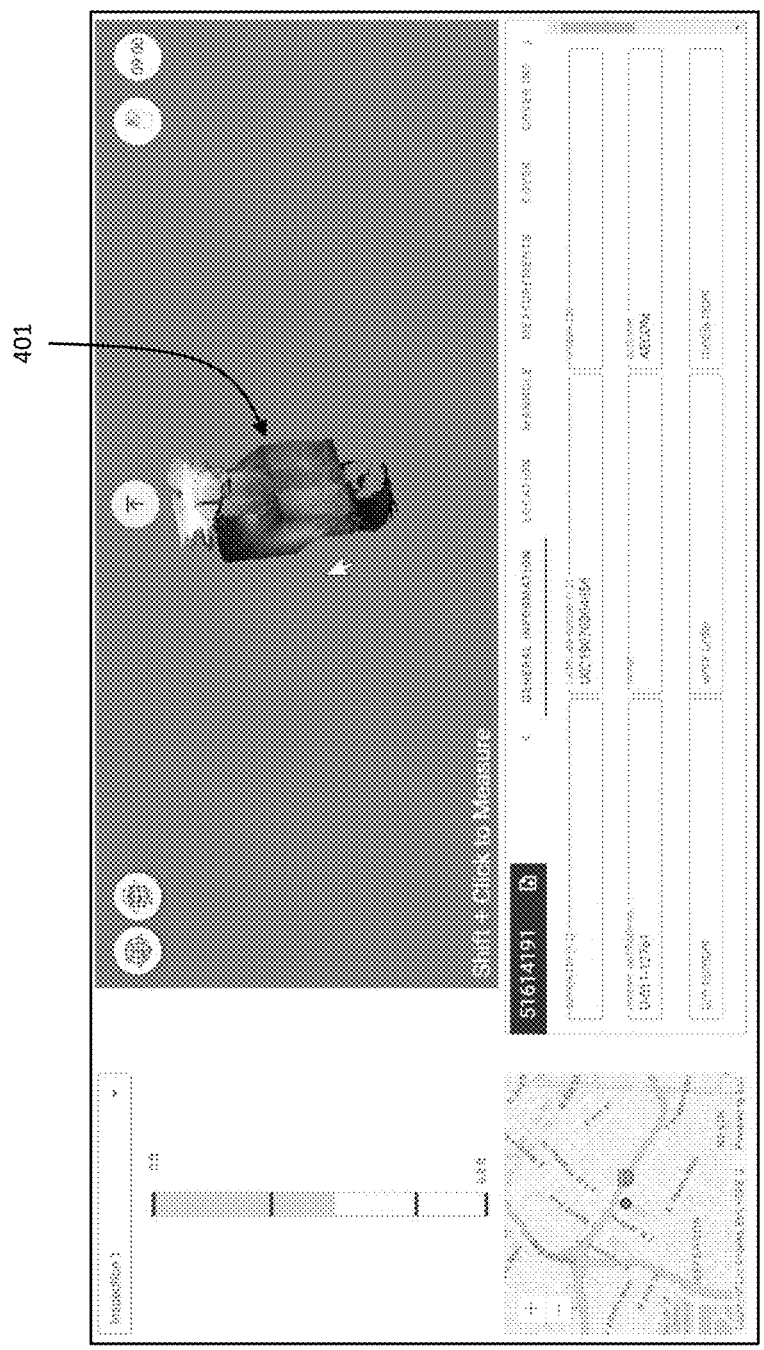
FIG. 4, FIG. 4A, FIG. 4B, FIG. 4C, FIG. 4D, and FIG. 4E illustrate examples of building a photo-realistic model and image using image data and pixel data from videos.
Figure 4A:
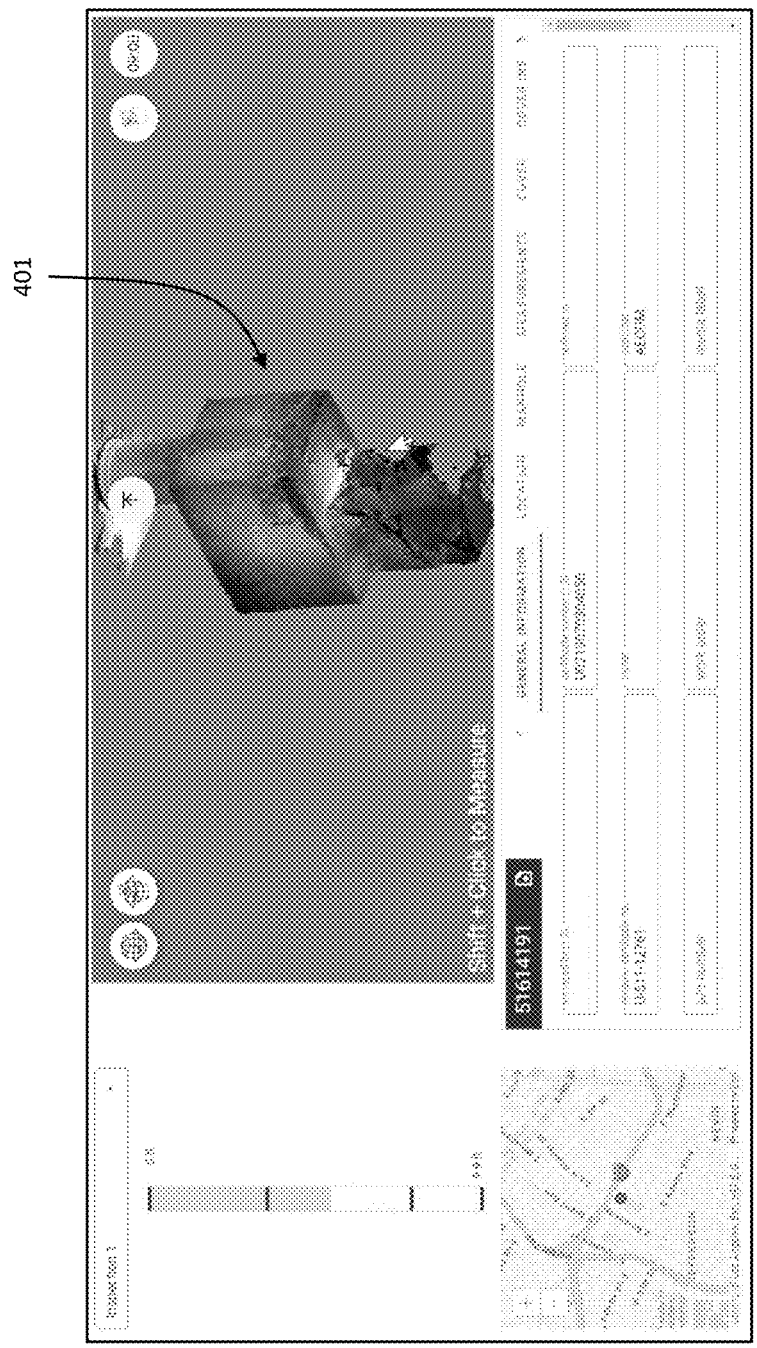

To offer a better understanding, and referring to FIG. 4, an example display interface is illustrated comprising a model 401 that is populated with image pixels derived from original videos obtained from a multi-camera inspection platform, e.g., the system 100 illustrated in FIG. 1. In FIG. 4 it can be appreciated that the model 401 is an interactive, 3D, photo-realistic representation of an infrastructure asset, here a manhole and associated chamber. In the example of FIG. 4, the "outside" of the asset is viewable and the model 401, may be rotated, e.g., with a mouse or other input, such as touch screen input. The "outside" view is an image, comprised of pixels of the interior of the asset, selected from among the image frames offering the best-fit view given the model 401 mesh data. FIG. 4A illustrates the model 401 rotated via user input to reveal another view of the infrastructure asset.

Figure 4B:
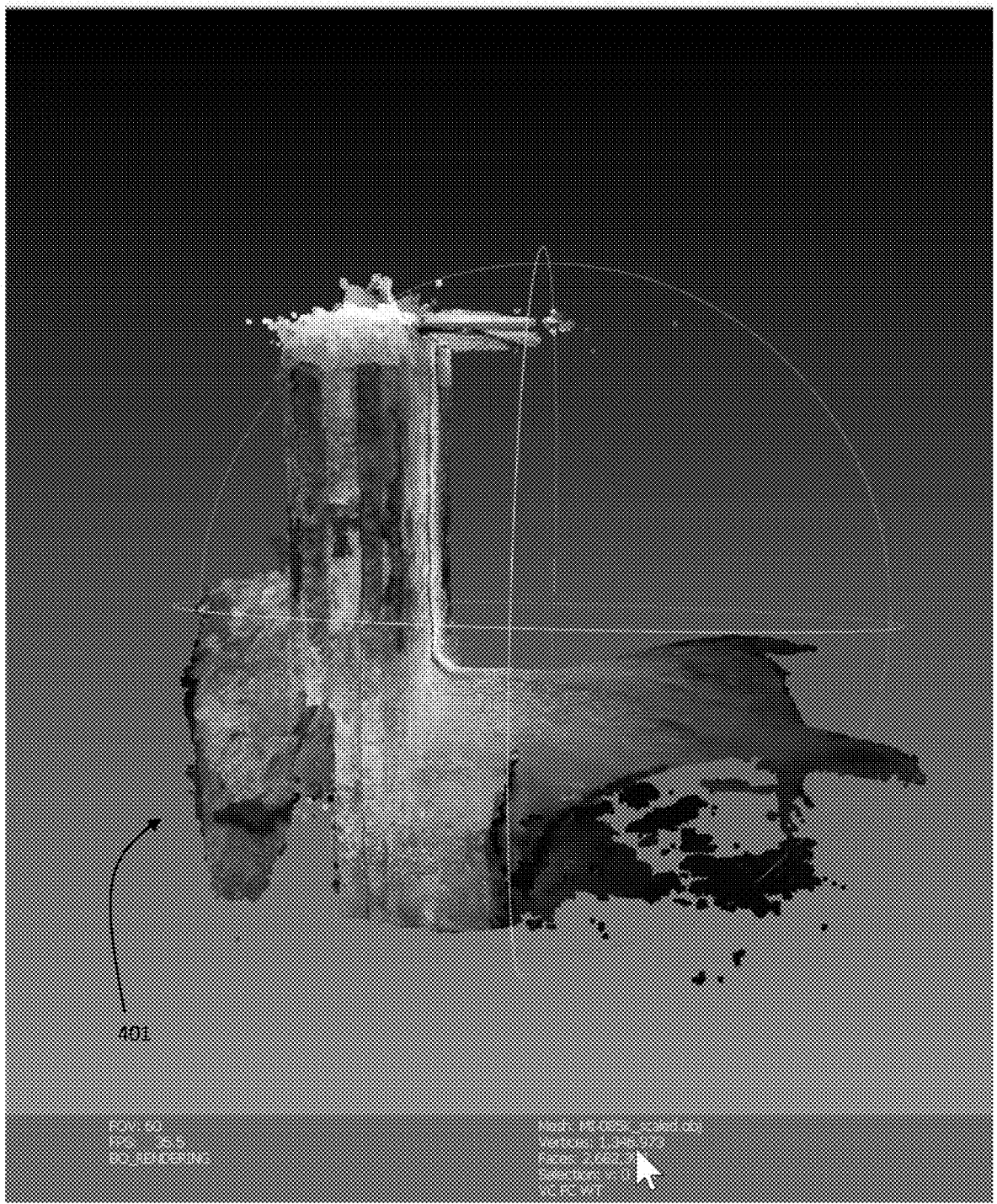

FIG. 4B-E illustrate series of images that may assist with a further appreciation of the process outlined in FIG. 3 with respect to forming a photo-realistic image based on a model, including pixel selection. In the example of FIG. 4B, a model 401 is illustrated for another manhole and associated conduit. The model of FIG. 4B is populated with pixels selected from among the available video frames using metadata comprising faces and vertices, which in turn outline the physical structure of the model by overlying the model's mesh.

Figure 4C:

Turning to the view offered by FIG. 4C, an example of the underlying points or vertices 401a of the model 401 is illustrated. Here, the model provides points in space, or vertices, that present the physical location of the infrastructure asset, e.g., obtained from stereo image data computations made available via software such as that described herein. By way of specific example, an HD video obtained from two or more of cameras 104-104d may be used to obtain metadata comprising 1,346,973 vertices and 2,682,393 faces for the manhole under inspection. It is noted that this is a non-limiting example of a dense point cloud provided by an embodiment. Each of the vertices represents a point in the collective stereo imagery, e.g., an overlapping point in frames from adjacent cameras as described herein. As such, the vertices comprise virtualized spatial information that may be related to one another via faces, as illustrated in FIG. 4D.

Figure 4D:
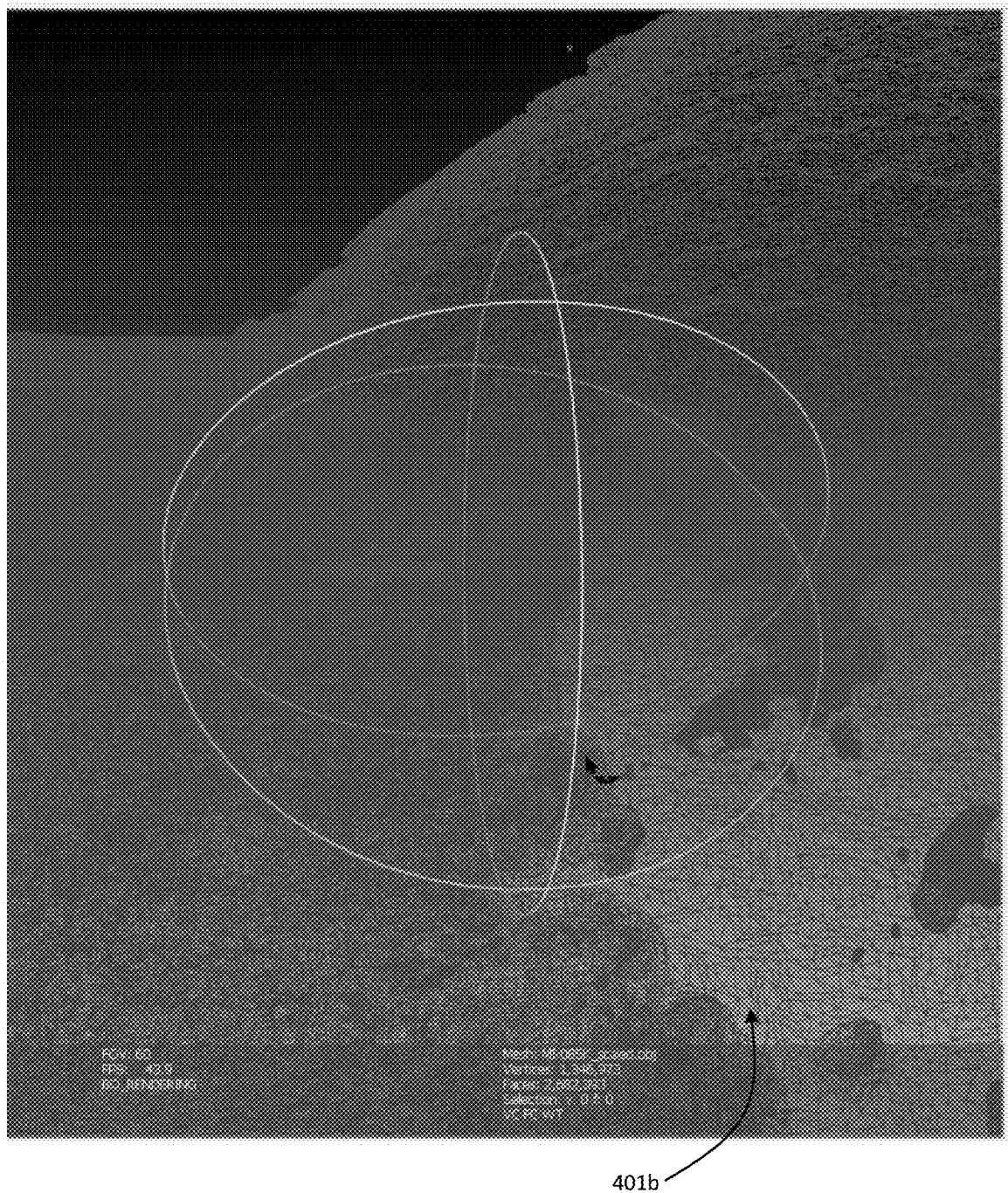

As shown in FIG. 4D, once the vertices are obtained for the model, faces 401b may be drawn between the vertices, connecting them into a virtualized 3D structure. In the example of FIG. 4D, 1,346,973 vertices are used for the corresponding 2,682,393 faces. The sides of the faces or mesh (small black lines connected together at points (vertices)) are visible in the view provided by FIG. 4D.

Figure 4E:
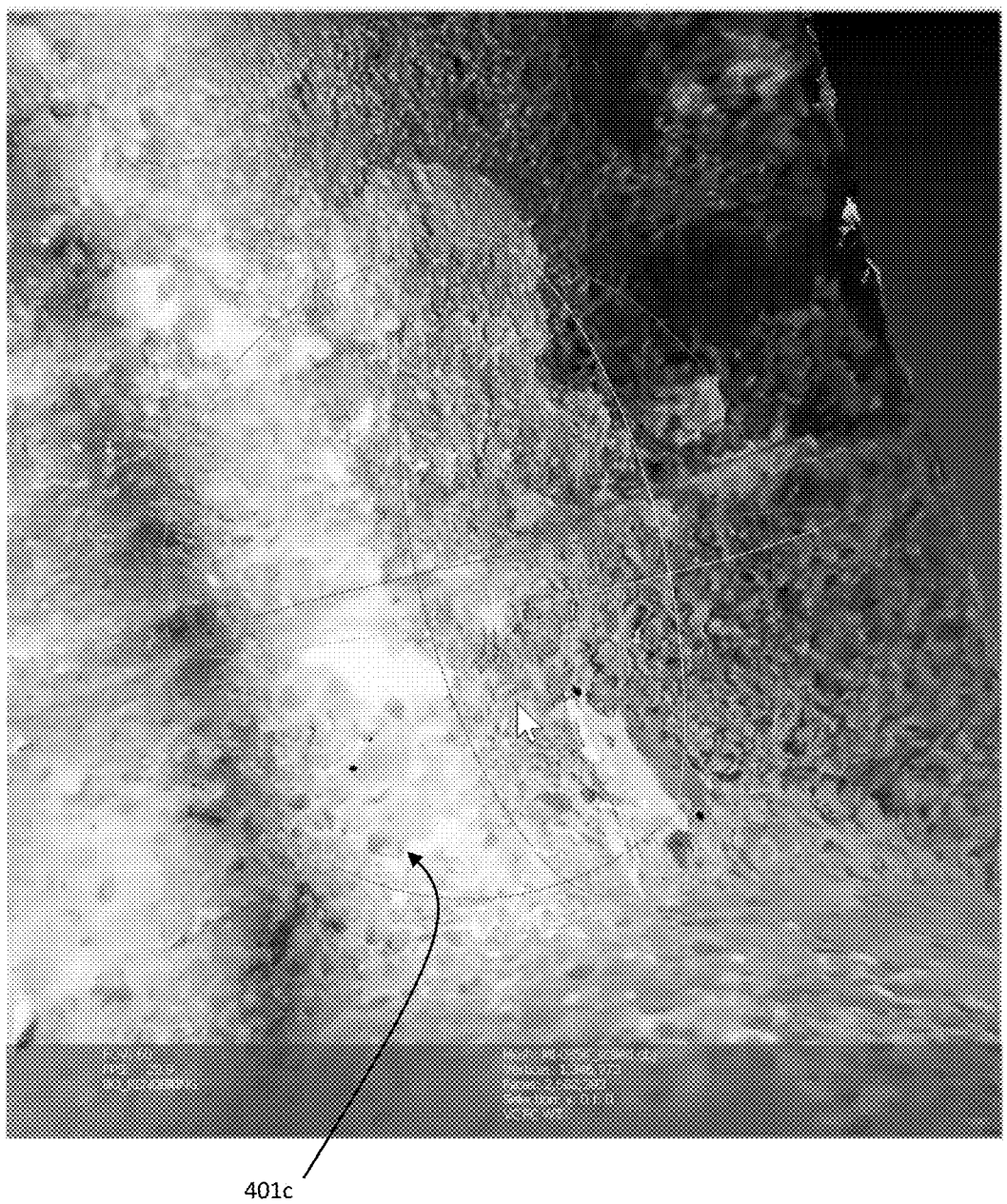

Turning now to FIG. 4E, the image metadata in the form of a mesh (sides of faces) may be utilized to select a pixel to represent the vertices or points in the model, projecting or painting selected pixels back into the model from the video frames. As indicated at 401c, the pixels selected, e.g., on the basis of selecting the camera having the best point of view of the vertices as dictated by the model, are inserted into the model to populate it as a photo-realistic image of the infrastructure asset that may be viewed from the interior, exterior or combinations of the foregoing.

As may be appreciated, the described techniques permit for densely populating a model to produce a photo-realistic image or visual point cloud representation of an infrastructure asset. In one example, culling may be used to alter the transparency of the photorealistic image or part thereof, e.g., dynamically or via response to user input. This permits adding or removing data from the populated model or part thereof. In one example, culling or removal allows an end user to, e.g., via an interface element such as a slider or input element, to look through a front facing wall in a 3D structure to observe a rear facing wall.

Figure 5:
FIG. 5 illustrates an example of quantitative scaling using a photo-realistic model.

As in FIG. 5, given the amount of points provided by the photo-realistic image 501 and the structure of the underlying model, e.g., with faces of similar or the same length, a user may highlight or otherwise indicate a feature in the model, such as the manhole's opening 502 illustrated in FIG. 5, to have a dimension calculated. Here, a user may indicate a feature of interest, e.g., draw across the manhole opening 502 (indicated by the dashed line in FIG. 5), in order to have the dimension calculated, such as receiving the diameter of the manhole in millimeters, centimeters, inches, etc. As may be appreciated, due to the underlying structure of faces or points of the model, which may be evenly spaced for a given resolution, any dimension selected may be used to scale other dimension, e.g., the length of the chamber imaged, as indicated with the dotted line in FIG. 5. Alternatively or additionally, the dimensions of a set of features, e.g., commonly used features such as manhole opening size, internal chamber size, depth, water level, etc., may be automatically calculated and provided to the user, with or without the need to interface with the model.

Figure 6:
FIG. 6, FIG. 6A and FIG. 6B illustrate examples of photo-realistic video with frame alignment.
Figure 6A:
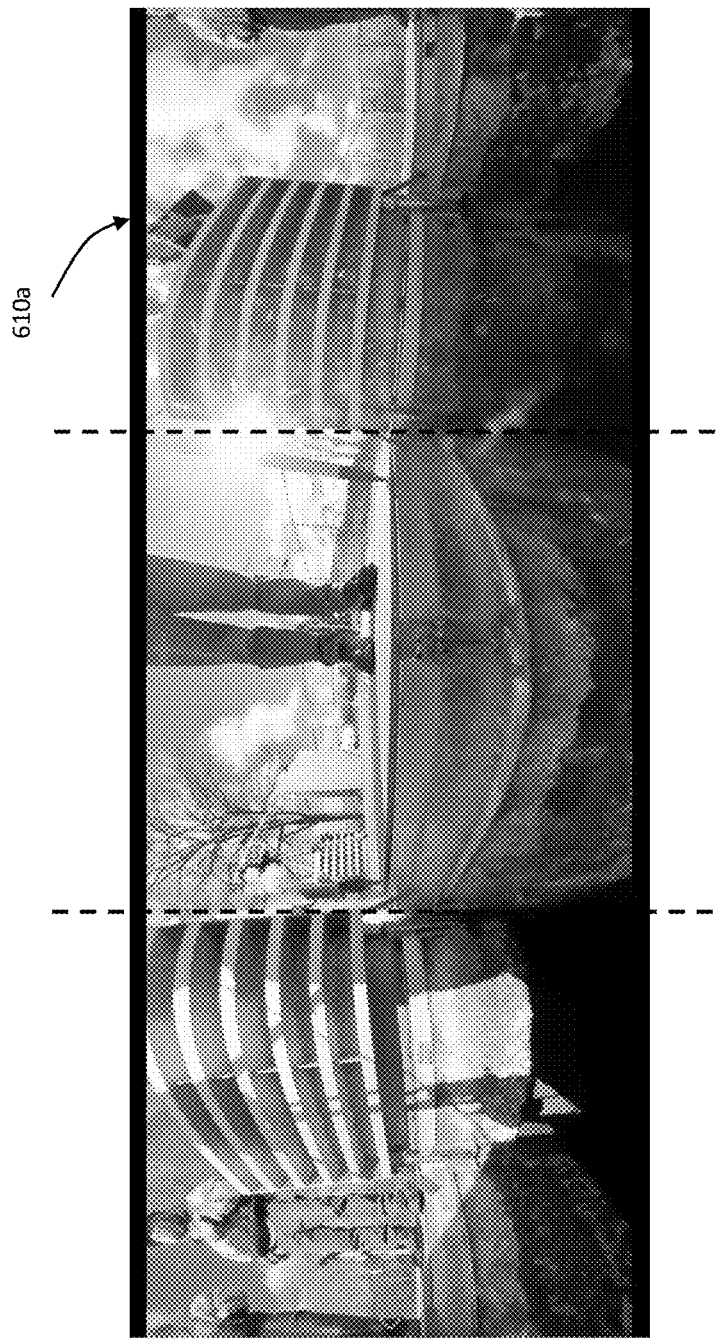
Figure 6B:
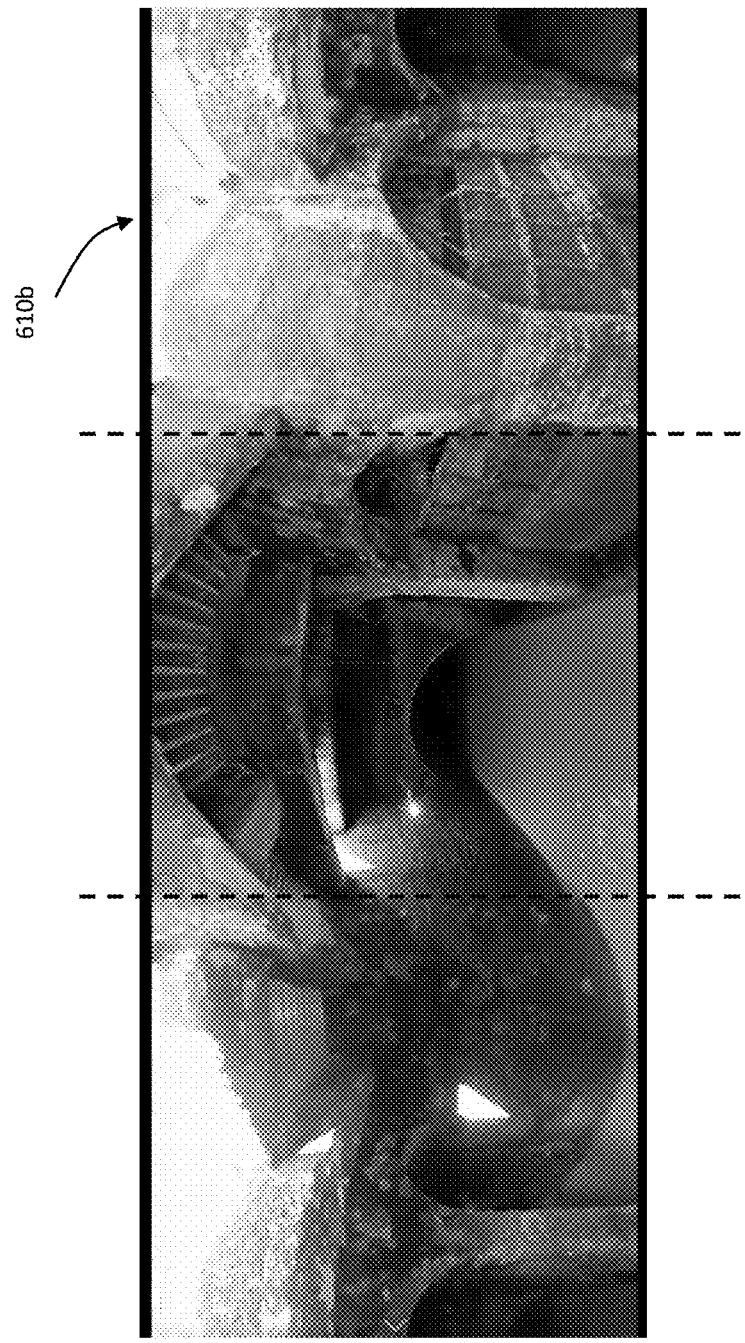

Turning to FIGS. 6, 6A and 6B, an embodiment may stitch or align adjacent video frames (obtained from adjacent video cameras) and provide the same in an de-warped or unwrapped video presentation 610. As can be appreciated from the views in FIG. 6A and FIG. 6B, an embodiment takes image frames from adjacent cameras, e.g., camera 104d, 104, 104b of FIG. 1C, and uses computer vision to identify features for aligning the frames. Parallax correction may or may not be applied, depending on the nature of the asset being imaged, the end user's desire for raw or processed imagery, etc. In the examples of FIG. 6A and FIG. 6B, frames from adjacent cameras have had their features identified and aligned (as illustrated by the dashed lines) such that a complete, 360 degree unwrapped video is provided. This permits the operator to see the entire spherical image of the chamber in a 2D presentation for more rapid review. As may be appreciated, virtual panning and zoom may be provided.

Example embodiments are described herein with reference to the figures, which illustrate various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are used in the figures, and a particular illustration of elements has been set forth, these are non-limiting examples. In certain contexts, two or more elements may be combined, an element may be split into two or more elements, or certain elements may be re-ordered, re-organized, combined or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, using one or more video cameras associated with an infrastructure inspection unit, two or more video frames of infrastructure;
    accessing, using one or more processors, image metadata indicating a model of connected points based on the two or more video frames;
    identifying, using the one or more processors, image data of the two or more video frames of the infrastructure;
    selecting, using the one or more processors, image data of the two or more video frames for inclusion in an output based on the model;
    wherein the selecting comprises selecting first image data of a single frame for inclusion in a photorealistic image; and
    outputting, using the one or more processors, the photo-realistic image of the infrastructure comprising the image data selected.

2. The method of claim 1, wherein the selecting is based on a point of view of a video camera of the one or more video cameras.

3. The method of claim 1, wherein the photo-realistic image comprises the model.

4. The method of claim 3, comprising providing, using the one or more processors, an interface element for culling data from the model.

5. The method of claim 3, comprising providing, using the one or more processors, an interface element for indicating a portion of the model.

6. The method of claim 5, comprising, responsive to receiving an indication via the interface element, providing quantitative measurement data for a feature of the infrastructure based on the model.

7. The method of claim 6, comprising automatically scaling, based on the feature, quantitative measurement data for one or more other features of the infrastructure based on the indication.

8. The method of claim 1, wherein the photo-realistic image is one or more of an image, a frame in a video, a virtual three-dimensional image, and the model comprising pixels of image data of the two or more video frames.

9. A computer program product, comprising:
 a non-transitory computer readable medium storing computer-executable code comprising:
 code for accessing two or more video frames of infrastructure;
 code for accessing image metadata indicating a model of connected points based on the two or more video frames;
 code for identifying image data of the two or more video frames of the infrastructure;
 code for selecting image data of the two or more video frames for inclusion in an output based on the model; and
 wherein the selecting comprises selecting first image data of a single frame for inclusion in a photorealistic image;
 code for outputting the photo-realistic image of the infrastructure comprising the image data selected.

10. The computer program product of claim 9, wherein the selecting is based on a point of view of a video camera of one or more video cameras.

11. The computer program product of claim 9, wherein the photo-realistic image comprises the model.

12. The computer program product of claim 11, comprising code for providing an interface element for culling data from the model.

13. The computer program product of claim 11, comprising code for providing an interface element for indicating a portion of the model.

14. The computer program product of claim 13, comprising code for, responsive to receiving an indication via the interface element, providing quantitative measurement data for a feature of the infrastructure based on the model.

15. The computer program product of claim 14, comprising code for automatically scaling, based on the feature, quantitative measurement data for one or more other features of the infrastructure based on the indication.

16. The computer program product of claim 9, wherein the photo-realistic image is one or more of an image, a frame in a video, a virtual three-dimensional image, and the model comprising pixels of image data of the two or more video frames.

17. A method, comprising:
 obtaining, from one or more video cameras associated with an infrastructure inspection unit, two or more video frames of infrastructure;
 accessing, using one or more processors, image metadata indicating overlap between the two or more video frames;
 identifying, using the one or more processors, image data of the two or more video frames of the infrastructure;
 selecting, using the one or more processors, image data of the two or more video frames for inclusion in an output based on the model;
 wherein the selecting comprises selecting first image data of a single frame for inclusion in a photorealistic image; and
 outputting, using the one or more processors, the photo-realistic image of the infrastructure comprising the image data selected.

18. The method of claim 3, comprising providing, using the one or more processors, an interface element for interacting with the model.

* * * * *